(12) United States Patent
Matthews

(10) Patent No.: US 7,402,132 B2
(45) Date of Patent: Jul. 22, 2008

(54) TREATING HAZARDOUS MATERIALS

(76) Inventor: Jack W. Matthews, 10055 Park Meadows Dr. #55009, Lone Tree, CO (US) 80124

(*) Notice: Subject to any disclaimer, the term of this patent is extended or adjusted under 35 U.S.C. 154(b) by 0 days.

(21) Appl. No.: 11/413,985

(22) Filed: Apr. 28, 2006

(65) Prior Publication Data
US 2006/0247484 A1 Nov. 2, 2006

Related U.S. Application Data

(60) Provisional application No. 60/676,062, filed on Apr. 29, 2005.

(51) Int. Cl.
B09B 1/00 (2006.01)
(52) U.S. Cl. .................... 588/256; 405/128.1
(58) Field of Classification Search ........... 588/256; 405/128.1, 266
See application file for complete search history.

(56) References Cited

U.S. PATENT DOCUMENTS 5,063,862 A * 11/1991 Saly ............... 110/346
5,143,654 A * 9/1992 Kikuchi et al. ........ 588/4
6,419,738 B1 * 7/2002 Classen et al. ........ 106/692
2007/0219404 A1 9/2007 Matthews

FOREIGN PATENT DOCUMENTS

WO WO02/48067 A1 * 6/2002

OTHER PUBLICATIONS

"Iodige Company History" http://www.loedige.de/en/index.php?a=3 printed Jul. 16, 2007.*
Cl:aire, "Stabilisation/Solidification Treatment and Remediation; Part 1: Summary of the State of Practice Reports I-IV", *technical bulletin (TB9)*, Cl:aire (Contaminated Land: Applications in Real Environments), www.claire.co.uk, (Jun. 2004), 4 pages.

* cited by examiner

*Primary Examiner*—John Kreck
(74) *Attorney, Agent, or Firm*—Blakely, Sokoloff, Taylor & Zafman LLP

(57) ABSTRACT

Methods of treating hazardous materials, such as, for example, contaminated soils, are disclosed. In one aspect, a method may include treating a contaminated soil with a hazardous material treatment composition to form a resulting material. In one aspect, the hazardous material treatment composition may include mostly salt, and from 0.5 to 15 wt % sorbent. The method may further include treating the resulting material with one or more inorganic binding agents. Other methods of treating hazardous materials are also disclosed, as well as compositions for treating hazardous materials.

30 Claims, 3 Drawing Sheets

TREATING HAZARDOUS MATERIALS

RELATED APPLICATIONS

The present application claims priority from and fully incorporates herein, U.S. Provisional Patent Application No. 60/676,062 entitled "TREATING MATERIALS AND HAZARDOUS MATERIALS", filed on Apr. 29, 2005. The U.S. Provisional Patent Application No. 60/676,062 is incorporated herein by reference.

FIELD

Embodiments of the invention pertain to methods and compositions for treating hazardous materials. In particular, embodiments of the invention pertain to methods and compositions for treating contaminated soils.

BACKGROUND INFORMATION

Tremendous volumes of soil worldwide are contaminated with hazardous materials, such as, for example, oil-derived hydrocarbons, and heavy metals, to name just a few examples. Soil remediation is a process by which the soil may be treated in order to reduce the level of hazardous materials in the soil. Large sums of money are spent on soil remediation.

There are numerous approaches for remediating contaminated soils. Representative approaches include, but are not limited to, biological treatment to biologically alter the hazardous materials, air stripping to strip the hazardous materials from the soil with air, soil washing to wash the contaminants from the soil, solvent extraction to extract the contaminants from the soil with a solvent, vitrification in which the contaminates are locked into the soil with vitrification, vacuum extraction in which a vacuum is used to extract the contaminants from the soil, and thermal desorption in which heat is used to thermally desorb the contaminants from the soil. The approaches may be performed either in-situ or else soil may be excavated and transported to a treatment facility.

However, there are known disadvantages associated with each of these approaches. For example, biological treatment may tend to be relatively specific for certain contaminants and may face challenges when mixed contaminants are present in the soil. Air stripping and vacuum extraction may be relatively ineffective when the contaminants have low volatility. Vitrification may tend to be challenging when the soil has flammable materials and may tend to be costly in operation and capital cost. Soil washing and solvent extraction tend to consume large volumes of water or solvent which then need to be processed and may tend to be expensive. Thermal desorption may tend to be expensive and energy intensive.

Thus there is a general need in the art for new and useful hazardous material treatment methods.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

Embodiments of the invention pertain to methods of treating hazardous materials. Other embodiments of the invention pertain to compositions to treat the hazardous materials. Further embodiments of the invention pertain to methods of making the compositions or methods of using the compositions. Yet further embodiments of the invention pertain to shaped products formed using the compositions and/or the methods.

In the following description, numerous specific details are set forth. However, it is understood that embodiments of the invention may be practiced without these specific details. In other instances, well-known structures and techniques have not been shown in detail in order not to obscure the understanding of this description.

I. EXAMPLE HAZARDOUS MATERIAL CONTAINMENT STRUCTURE HAVING MULTIPLE DIFFERENT MECHANISMS FOR CONTAINMENT

Figure 1:
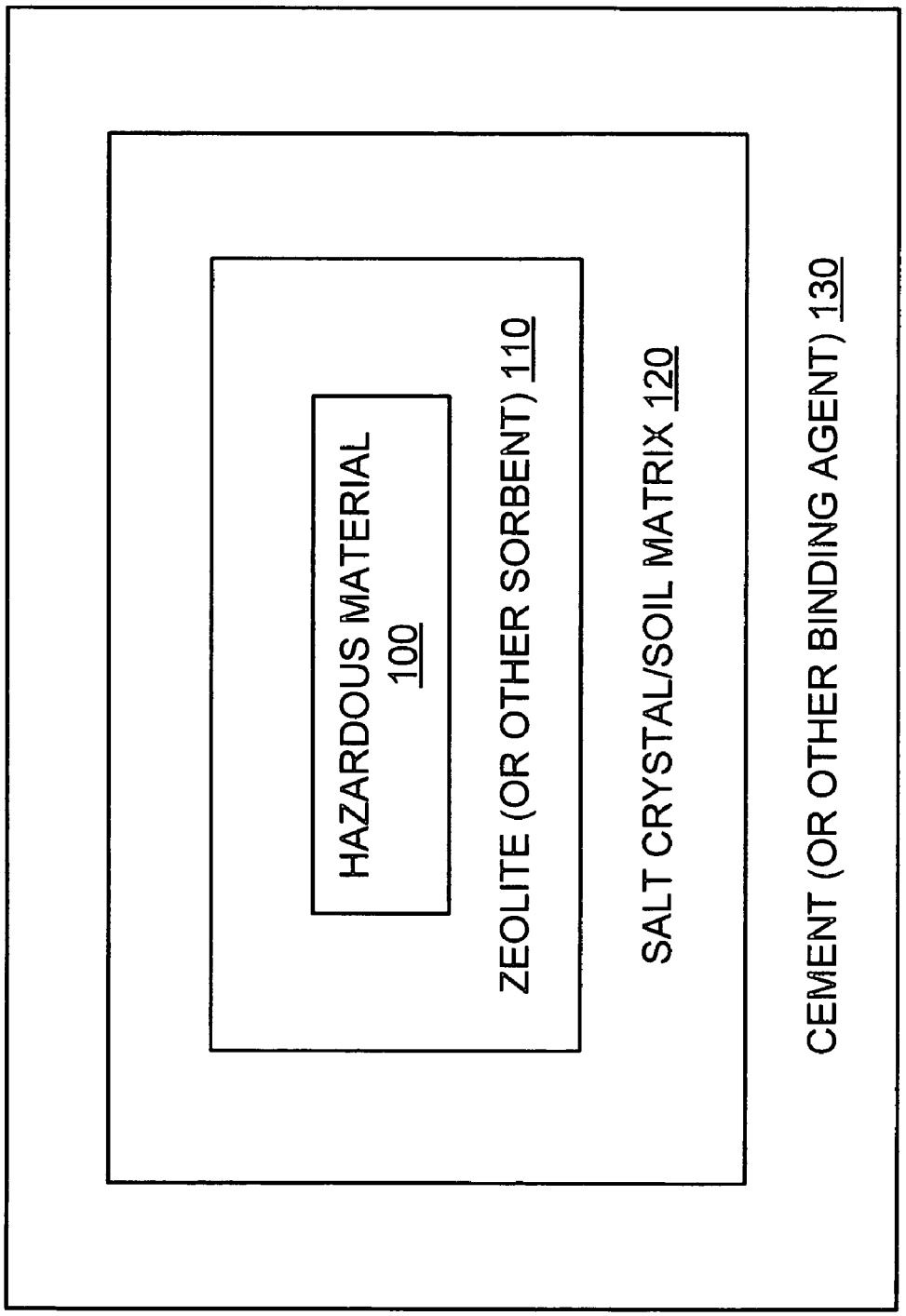
FIG. 1 conceptually illustrates a treated hazardous material within a containment structure, according to one or more embodiments of the invention.

FIG. 1 conceptually illustrates a treated hazardous material 100, such as, for example, a heavy metal, organic contaminant, or the like, within a containment structure 110, 120, 130, according to one or more embodiments of the invention. The containment structure includes a zeolite (or other sorbent) 110, a salt-crystal/soil matrix 120, and a cement (or other inorganic binding agent or hardening material) 130. A potential advantage of the multi-layered containment structure is that hazardous material may be sealed in the zeolite or other sorbent and contained by multiple different layers and mechanisms of containment.

The zeolite or sorbent may provide a first mechanism and material of containment for the hazardous material. The hazardous material may be selectively drawn into or sorbed and chemically held or retained in cavities or pores of the internal structure of the zeolite or other sorbent. Chemical bonds or interactions may be used to hold the ions or molecules within the zeolites or other sorbents. By way of example, heavy metal cations and other ions may be coordinated within the zeolite by an ion exchange process and held by ionic chemical forces.

The salt/crystal/soil matrix may provide a second layered mechanism and material of containment of the hazardous material. The zeolite or other sorbent may be coated or surrounded, at least partially, by a portion of the salt crystal/soil matrix. In the matrix, the crystals may be bonded with surfaces of the soil. The salt crystals may also be formed in and may tend to close off or block the pores or other openings of the zeolite or other sorbent. The salt crystal/soil within the pores may tend to be relatively dense and impenetrable by the hazardous material and may tend to close or seal the hazardous material therein. In some cases remaining ions or other hazardous material may be incorporated directly into the salt crystals, which may further help to immobilize and contain the hazardous material.

The cement or other inorganic binding agent or hardening material may provide a third outer mechanism and material layer of containment of the hazardous material. The cement may tend to coat, surround, and/or encapsulate the crystal/soil matrix. The cement may tend to fill in gaps in the crystal/soil matrix, and may tend to be formed in and close off remaining pores or other openings of the zeolite or other sorbent. This may further tend to close and seal the hazardous material within the cement. In some cases remaining ions or other hazardous material may be incorporated directly into the hardened cement by cementitious reactions, which may further help to immobilize and contain the hazardous material.

The use of a layered containment structure including multiple different material layers and mechanisms of containment may help to immobilize and contain the hazardous material. This may help to reduce leaching, migration, and other movement of the hazardous material.

A conceptual illustration of the sequential or layered containment process and result for a single sorbent particle have been used for purposes of illustration. It is to be appreciated that when dealing with real materials and processes, perfect layering may not necessarily always be achieved. In addition, such layering may be formed around clumps or other groups of particles, rather than a single sorbent particle.

II. EXAMPLE METHOD FOR TREATING HAZARDOUS MATERIALS

Figure 2:
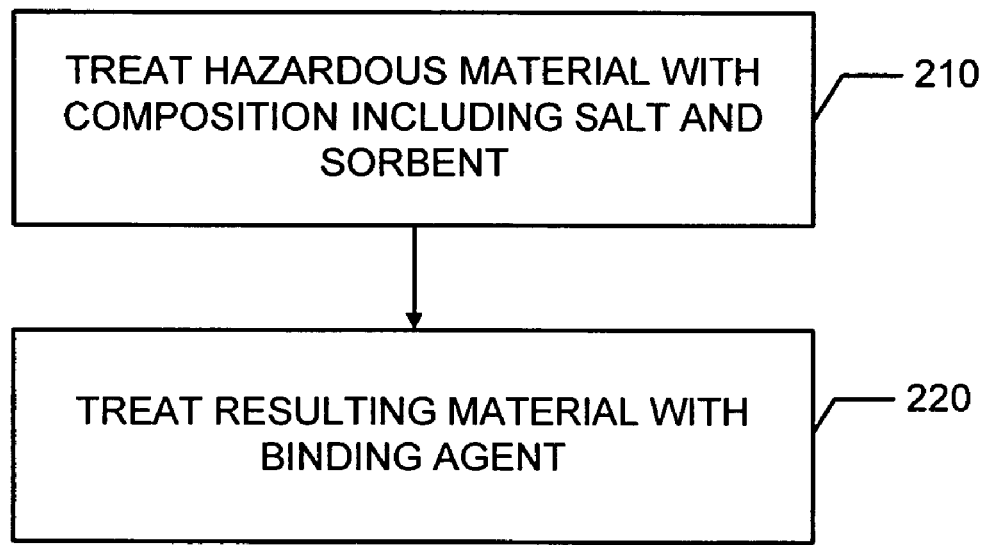
FIG. 2 is a block diagram of a method of treating a hazardous material, according to one or more embodiments of the invention.

FIG. 2 is a block diagram of a method 200 of treating a hazardous material, according to one or more embodiments of the invention. The method includes treating the hazardous material with a composition including a sorbent and a salt, at block 210. The sorbent may sorb at least a portion of the hazardous material, and the salt may crystallize around the sorbent to help encapsulate the hazardous material within the sorbent and/or the containment structure.

Then, the resulting treated hazardous material may be treated with an inorganic binding agent or hardening agent, such as, for example, cement, lime, tricalcium silicate, or other cementitious material, or combination thereof, at block 220. The hardening material or binding material may harden around the sorbent and salt crystals and further help to encapsulate or seal the hazardous material within the sorbent and/or the containment structure.

III. ANOTHER EXAMPLE METHOD FOR TREATING HAZARDOUS MATERIALS

Figure 3:
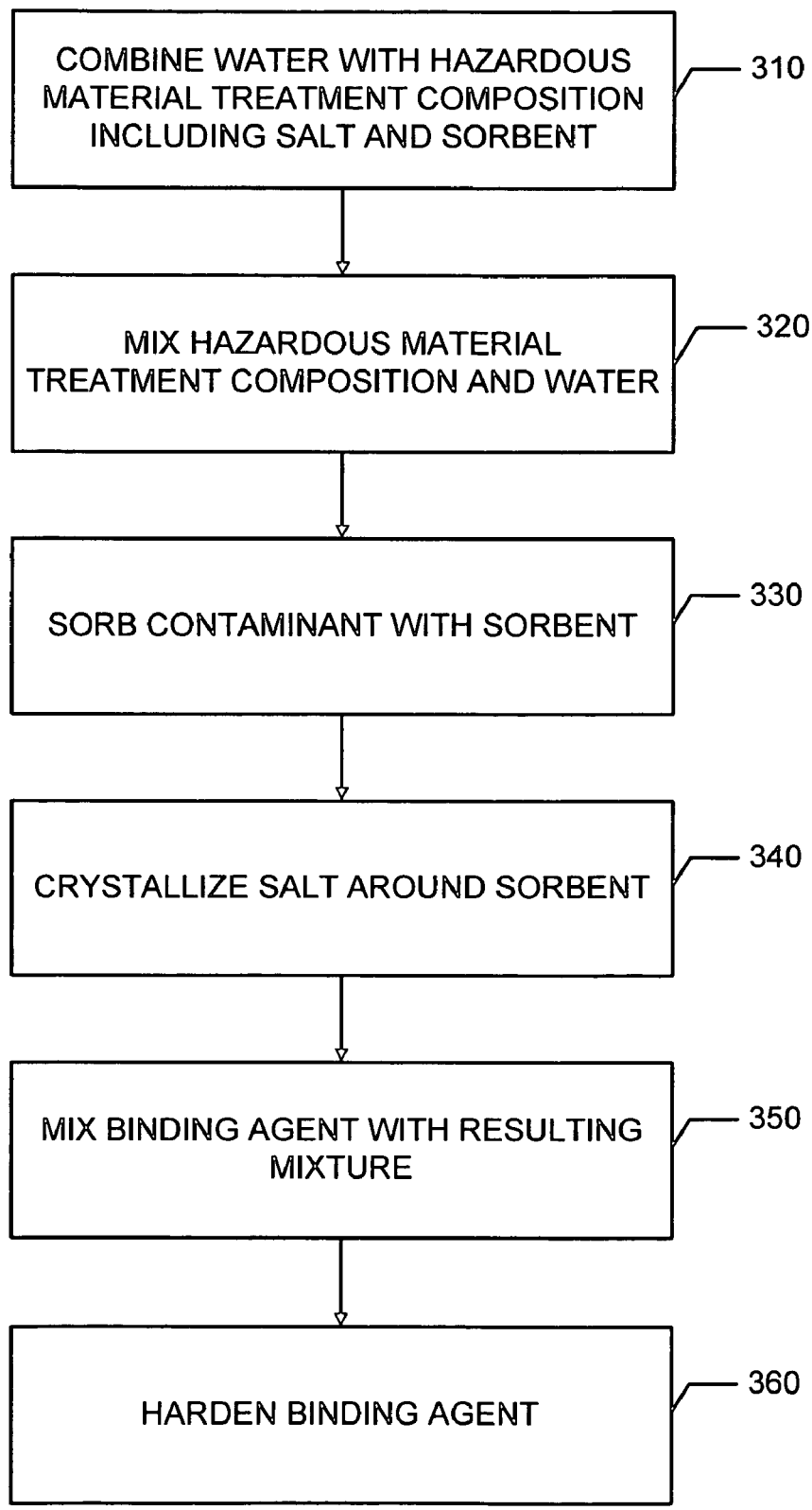
FIG. 3 is a block diagram of another method of treating a hazardous material, according to one or more embodiments of the invention.

FIG. 3 is a block diagram of another method 300 of treating a hazardous material, according to one or more embodiments of the invention. Examples of suitable hazardous materials that may be treated include, but are not limited to, contaminated soils, and industrial wastes or by-products or effluents. For purposes of illustration, the aforementioned method will be discussed largely in the context of treating contaminated soil, although the scope of the invention is not so limited.

A. Preparation of Treatment Composition and Soil

Shortly prior to use, such as, for example, from several minutes to several hours before use, a hazardous material treatment composition as disclosed elsewhere herein, may be combined with water, to form a thick solid-liquid sludge, "mud", or slurry, at block 310. The water of the slurry may be saturated or supersaturated with at least some of the salts of the hazardous material treatment composition. Alternatively, water may be added to the soil, or to the mixture of the soil and the treatment composition.

Contaminated soil may be shoveled, augered, mined, bulldozed, or otherwise removed from the contaminated site. By way of example, the soils or other materials may be contaminated with hazardous materials including, but not limited to, hydrocarbons (for example petroleum, petroleum derivatives, jet fuel, tars, gasoline, kerosene), halogenated hydrocarbons (for example tetrachloroethylene), polychlorinated biphenyls, poly-aromatic hydrocarbons, pesticides, other organic pollutants, heavy metals (lead, cadmium, mercury, etc.), other contaminants, and combinations thereof. If appropriate, the contaminated soil may optionally be introduced into the mixer and homogenized prior to treatment, although this is not required.

B. Mixing Hazardous Material with Treatment Composition and Water

Then, the sludge may be contacted with the contaminated soil and used to treat the contaminated soil. In one or more embodiments of the invention, the hazardous treatment composition and contaminated soil may be combined in a volume ratio that ranges from about 1:50 to 1:2, although the scope of the invention is not limited to these particular ratios. In one aspect, the composition added may provide an amount of zeolite that is sufficient to sorb the intended amount of the contaminant.

Referring again to FIG. 3, the hazardous material, the hazardous material treatment composition, and the water may be contacted and mixed, at block 320. In one or more embodiments of the invention, proper proportions of the contaminated soil and sludge may be introduced into and mixed in a mixer.

In one or more embodiments of the invention, the mixer may include a plough mixer, although this is not required. Non-limiting examples of a suitable plough mixers are the L-20, KM-1200, or KM-2000 ploughshare® mixers, which are commercially available from Lodige USA, Inc, of Ronkonkoma, N.Y., having the parent company of Warburg, Germany. The ploughshare® mixers may mix the components by utilizing a mechanically induced fluidized bed reportedly created by shovels that rotate close to inner walls of a drum and thrust the components inside the drum. In one or more embodiments of the invention, such mixers may be operated at from about 50 to 300 revolutions per minute (rpm) to achieve a Froude Number ranging from about 6 to 8, such as from 6 to 7, although this is not required.

In one or more embodiments of the invention, the contaminated soil and treatment composition may be mixed under such conditions for a period of time that is less than about 10 minutes, or less than about 7 minutes, such as, for example, from about 2 to 7 minutes. Often, the period of time is from about 3 to 6 minutes, and may be less than 5 minutes.

A potential advantage of using such plough mixers is that they may achieve comparatively good mixing of the contents of the drum in a relatively short period of time, which may tend to be compatible with the treatment processes described herein. The mixing action may also help to avoid separation of the salt crystals from around the zeolites. However, the scope of the invention is not limited to just these types of mixers. Other types of mixers may also optionally be used. For example, Hobart dough mixers have been tested and found to be suitable. In one aspect, the mixer may optionally be provided on a mobile platform, such as, for example, a bed of a vehicle, or a trailer, and moved to a remediation site and used there, although this is not required.

In one or more embodiments of the invention, the temperature in the mixer during the mixing process may be controlled to be in the range of about 80 to 120° F., although this is not required. Some of the heat may be provided by exothermic processes and additional heating and/or cooling may also optionally be used.

In one or more embodiments of the invention, the amount of water in the mixer during this stage of mixing may be adjusted or prescribed to be in the range of 10 to 20 wt %, such as, for example, from 12 to 16 wt %. A deflocculant such as sodium silicate may optionally be included and may allow reduction in water content, if desired. However, the scope of the invention is not limited in this respect.

C. Sorbing Hazardous Material with Sorbent

Referring again to FIG. 3, during the mixing period, and potentially shortly thereafter, the zeolites or other sorbents of the treatment composition may sorb at least a portion of the hazardous materials of the soil, at block 330. The zeolites or other sorbents may provide an environment that may sorb and retain or hold the hazardous materials. In one or more embodiments of the invention, the zeolites of the treatment composition may initially be dehydrated or dried so that they may sorb more water potentially laden with contaminants into their pores, although this is not required. In one or more embodiments of the invention, the zeolites may be pre-treated to promote binding or retention of the hazardous materials, although this is not required. As one example, a surfactant, such as, for example, hexadecyltrimethylammonium bromide, may be used to treat the zeolite to make the internal cavities of the zeolite affinitive for anions instead of cations. Treated and non-treated zeolites may be used for both cations and anions. As another example, a chlorine compound, such as, for example, a perchlorinate, may be used to create a stationary solvent phase in the cavities to customize sorption for organics. As another example, a small molecular or ion trap may be included in the zeolites. As yet another example, sodium hydroxide may be used to open up the internal structure, such as to facilitate sorption of larger molecules.

D. Growing Salt Crystals Around Sorbent

During the mixing period or process, salt of the treatment composition may start to form crystals that may grow in, on, and around, and coat particles, agglomerates, or other portions of the zeolites and soil, at block 340. Some of the salt materials may react with the surfaces of the soil and zeolites to provide good contact and adhesion and the salt materials may grow as crystals between the soil and zeolites. The salts may become occluded into the growing matrix as anion and cation donors. Water having the salts therein may be drawn or sorbed into the pores of the zeolites and thereafter crystals may form in the pores or internal structure to help seal the hazardous materials in the zeolites. This may result in an aggregate in which the crystals bound to the soil and zeolites form a coating, sheath, or encapsulation layer to help encapsulate the hazardous materials within the cavities of the zeolite. This may tend to reduce leaching or removal of the hazardous materials from the cavities of the zeolites. In some cases, ionic hazardous materials may potentially be incorporated directly in the salt crystals by salt crystal formation reactions or by the salt crystals growing around them, which may further help to contain these materials.

It is presently thought that excessive mixing may potentially tend to reduce the effectiveness of the containment of the hazardous materials. Without wishing to be bound by this particular theory, one potential explanation is that the chloride salts and other salts may be over mixed or "emulsified" with the soil, which may tend to hinder crystal growth and/or encapsulation of the hazardous materials within the cavities of the zeolites. Another potential explanation is that excessive mixing may potentially break the salt crystals free of the zeolites.

E. Mixing Cement with Sorbent and Salt Crystal Mixture

Referring again to FIG. 3, after mixing the hazardous materials with the hazardous material treatment composition as described above, the resulting mixture or treated product may optionally be further treated with cement or another inorganic binding agent. The cement or other inorganic binding agent may be mixed with the aforementioned resulting mixture, at block 350.

In various embodiments of the invention, the cement may be mixed in an amount that is from about 0.5 to 10 wt %, or from about 0.5 to 5 wt %, or from about 1 to 3 wt % of the total volume of hazardous material treated, although the scope of the invention is not so limited. More cement may also optionally be used, although this may tend to increase the cost of treatment. The mixing may coat or otherwise provide the cement or other inorganic binding agent or composition around particles, clumps, or other portions of the zeolite, and growing and/or grown crystals.

In one or more embodiments of the invention, the inorganic binding agent may be introduced into the same mixer that already contains the mixture previously described. Alternatively, a different mixer may be used. In one aspect, a first mixer to mix in the treatment composition and a second mixer to mix in the lime and/or cement may be connected in series with one another to provide a continuous mixing process, which may potentially help to reduce downtime needed to load and unload mixers.

In one or more embodiments of the invention, the cement and/or lime may be mixed with the treated hazardous material mixture for a period of time ranging from about 30 seconds to 3 minutes, although this is not required. In aspects, the period of time may be less than 2 minutes, or less than 1 minute, although this is not required. It is presently thought that excessive mixing may tend to disrupt the encapsulation or containment structure.

When adding the cement, or during the mixing period, the water content in the mixer may optionally be adjusted to a value that is appropriate to promote formation of good hardened monolith. For example, in one or more embodiments of the invention, an adjustment amount of water may be added to give final water content is in the range of from about 14 to 18 wt %. A deflocculaant such as sodium silicate may optionally be used to reduce amount of water or otherwise.

F. Hardening the Binding Agent Around Sorbent and Salt Crystals

Referring again to FIG. 3, the cement or other binding agent may harden, at block 360. As it hardens, the cement may provide a hard coating, sheath, or encapsulation layer around the particles, clumps, or other portions of the zeolite, and growing and/or grown crystals, which may further help to reduce leaching or other escape of the hazardous material from the internal structures of the zeolites. The cement or other inorganic binding agent may also contribute solidity, mechanical integrity, and/or strength to the treated material. In some cases, heavy metals, ions, or other hazardous materials may be incorporated directly in the cement potentially by cementitious reactions, which may further help to contain these materials.

G. Example Optional Variations of the Described Method

Various exemplary hazardous material treatment methods have been described in conjunction with FIG. 3, although the scope of the invention is not limited to just these particular methods. Alternate methods are contemplated in which operations are performed in different order. For example, water may be combined after commencement of mixing of the hazardous material treatment composition and the hazardous material. As another example, water may first be combined with the soil instead of the treatment composition. Still alternate methods are contemplated in which operations are added to the methods. For example, the unhardened cementitious mixture may be shaped or molded. As another example, soil analysis may be performed and a treatment composition may be tailored based on the soil analysis. Many further modifications and adaptations may be made to the methods and are contemplated.

IV. EXEMPLARY USES OF THE TREATED HAZARDOUS MATERIALS

A. Soil Stabilization

One or more building codes, such as, for example, one or more regional building codes and/or the Universal Building Code, may govern the building of structures on a particular soil or land. These codes may specify in part minimum compressive strength to support buildings thereon. If the native compressive strength of the soil or land is insufficient or too low, soil conditioning may be performed to increase the compressive strength, so that building on the soil or land may be permitted.

By way of example, a real estate developer or other entity may desire to build one or more buildings on land that is contaminated with a hazardous material, such as, for example, petroleum products, pesticides, mine tailings, or the like. Soil from the land may be sampled and tested for compressive strength. In some cases, the compressive strength of the native soil or land may also be lower than that required by one or more building codes in order for buildings or other structures to be constructed on the land.

In accordance with one or more embodiments of the invention, the hazardous material contaminating the land may be treated as disclosed elsewhere herein. In addition, in accordance with one or more embodiments of the invention, the resulting treated hazardous material may be returned to the land and used for soil conditioning and/or to increase the compressive strength of the soil or land upon which one or more buildings are to be constructed or otherwise provided. A method, according to one or more embodiments of the invention, may include returning treated contaminated soil including cement or other inorganic binding agent back to the site to replace the contaminated soil that was removed in order to increase the compressive strength of the resulting soil or land.

In one or more embodiments of the invention, the contaminated soil may be treated with an amount of cement or other inorganic binding agent that is sufficient to mechanically stabilize the soil concurrent with the remediation. A greater amount of cement or other inorganic binding agent generally provides a greater increase in the compression strength of the soil. For example, in one or more embodiments of the invention, an amount of cement or other inorganic binding agent to be used for treatment that would result in at least a specified, regulated, or otherwise predetermined compressive strength may be estimated, calculated, empirically measured, or otherwise determined based, at least in part, on one or more, or both of, a measured native compressive strength of the soil and/or one or more predetermined compressive strengths specified by one or more building codes.

B. Forming Useful Shaped Objects or Products

In one or more embodiments of the invention, after mixing in the cement, lime, or other inorganic binding agent, but prior to hardening, the mixture including the unhardened cement or other inorganic binding agent may be molded or otherwise shaped and then hardened to form one or more useful molded or shaped objects or products. Examples of suitable useful molded or shaped objects or products include, but are not limited to, jersey barriers, sidewalk panels, bricks, cement pipes, housing siding, other building and construction materials, and other objects that will be apparent to those skilled in the art and having the benefit of the present disclosure. Advantageously, building or construction materials may be formed on-site from on-site materials instead of having to be hauled in. In one or more embodiments of the invention, a solid material with a lower density than water, such as, for example, Styrofoam, other plastics, wood, or the like, may be used as a filler, in order to form a boat dock or other structure that may float. Alternatively, the material may be used for road base or the like. Advantageously, a contaminated soil or other contaminated material may be converted into a useful object or objects that may have some value and potential for use and/or resale.

V. EXAMPLE HAZARDOUS MATERIAL TREATMENT COMPOSITIONS

As described above, in one or more embodiments of the invention, a hazardous material, such as, for example, contaminated soil and industrial effluents or by-products, may be treated with a hazardous material treatment composition containing salt and sorbent. A hazardous material treatment composition, according to one or more embodiments of the invention, may include in relatively larger proportion or mostly a salt mixture and in relatively smaller proportion one or more sorbents to sorb one or more hazardous materials. As used herein, mostly salt means more than 50% salt. By way of example, in one or more embodiments of the invention, the hazardous material treatment composition may include at least 75 wt % salt, such as, for example, from about 75 to 99.5 wt % salt, and at least 0.5 wt % sorbent, such as, for example, from 0.5 to 25 wt % sorbent, although the scope of the invention is not so limited.

The inventor has considered numerous different possible treatment compositions, including compositions with varying amounts of various different types of salts, and different types of sorbents. This section describes various embodiments of hazardous material treatment compositions that may be used. However, the scope of the invention is not limited to these particular treatment compositions. Many further modifications and variations of these treatment compositions are contemplated and will be apparent to those skilled in the art and having the benefit of the present disclosure.

A suitable salt mixture, according to one or more embodiments of the invention, may optionally include one or more halide salts, such as, for example, one or more chloride salts, together with one or more sulfate salts, although this is not required. The inclusion of both sulfate and halide salts may allow encapsulating the zeolites within a matrix of different crystals formed integrally with one another which may tend to improve encapsulation. The halide and sulfate salts may crystallize to form different crystal structures that may interlock and thereby help to contain hazardous materials within a matrix. The sulfate salts may tend to promote formation of monoclinic crystals and other different crystal shapes, which may tend to add integrity to the salt crystals and promote good encapsulation. One particular example of a suitable sulfate salt is magnesium sulfate, although others are also suitable. Chloride salts tend to promote good and rapid crystal growth. In one or more embodiments of the invention, the one or more halide salts may optionally include one or more monovalent cation salts, and one or more polyvalent cation salts, although this is not required. Suitable monovalent halide salts include, but are not limited to, sodium chloride, ammonium chloride, potassium chloride, and the like. Suitable polyvalent halide salts include, but are not limited to, calcium chloride, magnesium chloride, magnesium fluoride, and the like. In one aspect, this may create different crystal structures that may add diversity and interlock to aid containment. This may further promote containment of the hazardous materials within the confines of a matrix of inter-grown crystals and potentially help to reduce leaching of hazardous materials.

One type of suitable sorbent is a zeolite. A zeolite may include a natural or synthetic hydrous silicate or aluminosilicate microporous solid that may have a highly organized or structured open three-dimensional crystal structure of openings and cavities in a lattice. The zeolite may act as a molecular sieve, adsorbent, and/or ion exchanger to selectively sorb molecules and/or ions of suitable size into the internal structure based, at least in part, on a size exclusion process and/or the chemical environment inside the cavities. Other suitable sorbents include, but are not limited to, chelating agents, and other materials known to have binding or bonding properties with respect to known types of hazardous materials. Calcined clays, activated carbons, and like sorbents may also potentially be used in some embodiments depending upon the particular hazardous material and implementation. For example, bentonite, illite and kaolin (all potentially calcined) may potentially be used, depending upon the particular implementation. Bentonite, illite and kaolin are also aluminosilicates. Combinations of different types of sorbents may optionally be included in the composition, such as, for example, to each sorb different types of hazardous materials. The total sorbent included in the composition may be based, at least in part, on the amount of hazardous material to be sorbed. In various embodiments of the invention, the total sorbent may be less than 15 wt %, less than 10 wt %, less than 5 wt %, and/or more than 0.5 wt %, although this is not required.

Other components may optionally be included in the hazardous material treatment composition. For example, magnesium may optionally be included in order to help react with soil, or the like to help promote strong and integral attachment of the crystals to the soil, although this is not required. A relatively higher soluble form of magnesium, such as, for example, magnesium oxide, may optionally be included to increase the amount of soluble magnesium when the composition is combined with water.

As another example, the composition may optionally include one or more pH adjustment chemicals, such as, for example, sodium bicarbonate, sodium carbonate, potash, or another base, or a combination of bases, to promote a basic pH, although this is not required. A basic pH, such as, for example, a pH greater than 10, or greater than 11, or greater than 12, may potentially help to avoid build up of hydrogen gas during storage. The high pH may also help to protect against unexpected exposure to acid.

As yet another example, the composition may optionally include one or more anti-corrosion chemicals or salts, such as, for example, aluminum chloride, although this is not required. The aluminum chloride may help to reduce corrosion of steel and certain other metals. Aluminum chloride may be included in various proportions in the composition depending upon whether or not the potential for corrosion is of concern.

As a still further example, an indicator chemical or material may optionally be included in the composition to provide an aid for visually or otherwise assessing the degree of mixing of the mixture or the homogeneity, although this is not required. Suitable indictor chemicals or materials include, but are not limited to, potassium permanganate, dyes, ferromagnetic particles, or other materials whose relative concentration in the mixture may readily be assessed. These are just a few examples.

VI. SPECIFIC EXAMPLES OF SUITABLE HAZARDOUS MATERIAL TREATMENT COMPOSITIONS

An example of a suitable hazardous material treatment composition, according to one or more embodiments of the invention, is disclosed in Table 1. Components and concentrations are listed.

TABLE 1

| Component | Concentration (wt %) |
|---|---|
| Salt | 75-99.5% |
| Sorbent | 0.05-25% |

Another example of a suitable hazardous material treatment composition, according to one or more embodiments of the invention, is disclosed in Table 2. Components and concentrations are listed.

TABLE 2

| Component | Concentration (wt %) |
|---|---|
| Monovalent Halide Salt | Remainder |
| Polyvalent Halide Salt | 0-35% |
| Sulfate Salt | 0-5% |
| Anti-Corrosion Agent | 0-5% |
| Magnesium Oxide | 0-5% |
| Base | Sufficient to give pH > 10 |
| Sorbent | 0.5-25% |

In various embodiments of the invention, from all to a small amount of one or more, or various combinations, of the polyvalent halide salt, the sulfate salt, the anti-corrosion agent, and magnesium oxide, may optionally be omitted from the composition. The remaining percentage or bulk of the mixture may be made up of a monovalent halide salt, such as, for example, sodium chloride, which is widely available and relatively inexpensive.

Yet another example of a suitable hazardous material treatment composition, according to one or more embodiments of the invention, is disclosed in Table 3. Components, concentrations, and optional particle sizes are listed.

TABLE 3

| Component | Concentration (wt %) | Particle Size |
|---|---|---|
| Sodium Chloride | Remainder | 0-1 mm |
| Ammonium Chloride | 0-2% or about 1% | 0-1 mm |
| Aluminum Chloride | 0-5% or about 3% | 0-1 mm |
| Potassium Chloride | 0-20% or about 15% | 0-1 mm or flocks |
| Calcium Chloride | 0-20% or about 15% | 0-5 mm |
| Magnesium Chloride | 0-20% or about 15% | fine grain or 50 mesh |
| Magnesium Oxide | 0-4% or about 2% | −200 mesh |
| Magnesium Sulfate | 0-4% or about 3% | 0-1 mm |
| Sodium Carbonate | 0-4% or about 3% | 0-1 mm |
| Zeolite (ASM A4) | 1-10% or about 2-6% | −325 mesh |
| Potassium Permanganate | 0-2% or about 0-1% | 0-1 mm |

In various embodiments of the invention, from all to a small amount of one or more, or various combinations, of ammonium chloride, aluminum chloride, potassium chloride, calcium chloride, magnesium chloride, magnesium oxide, magnesium sulfate, sodium bicarbonate, and potassium permanganate, may optionally be omitted from the composition. The remaining percentage or bulk of the mixture may be made up of sodium chloride.

A still further example of a suitable hazardous material treatment composition, according to one or more embodiments of the invention, is disclosed in Table 4. Components, concentrations, and optional particle sizes are listed. In this composition, the term "about" means ±50% of the indicated amount for indicated amounts that are less than 5% and ±20% of the indicated amount for indicated amounts that are over 5%. In this composition, the remaining percentage or bulk of the mixture may be made up of sodium chloride. Sodium chloride may be present in the highest concentration.

TABLE 4

| Component | Concentration (wt %) | Particle Size |
|---|---|---|
| Sodium Chloride | about 35% | 0-1 mm |
| Ammonium Chloride | about 1% | 0-1 mm |
| Aluminum Chloride | about 3% | 0-1 mm |
| Potassium Chloride | about 15% | 0-1 mm or flocks |
| Calcium Chloride | about 15% | 0-5 mm |
| Magnesium Chloride | about 15% | fine grain or 50 mesh |
| Magnesium Oxide | about 2% | −200 mesh |
| Magnesium Sulfate | about 3% | 0-1 mm |
| Sodium Carbonate | about 3% | 0-1 mm |
| Zeolite (ASM A4) | about 1-5% | −325 mesh |
| Potassium Permanganate | about 0-1% | 0-1 mm |

Many other variations of the compositions included in Tables 1-4 are contemplated and will be apparent to those skilled in the art and having the benefit of the present disclosure. For example, compositions are contemplated that include additional components, omit one or more of the listed components, and/or have the components in different proportions. The scope of the invention is not limited to any known composition.

Compositions like those shown above, or variations of these compositions, may include solid particulate materials or powders that may be mixed or otherwise combined together in the indicated proportions. The resulting mixtures may optionally be sealed in a container or otherwise packaged and optionally stored until an intended time of use.

VII. OPTIONALLY TAILORING HAZARDOUS MATERIAL TREATMENT COMPOSITIONS TO PARTICULAR HAZARDOUS MATERIALS

The hazardous material treatment compositions disclosed above are suitable for treating a wide variety of contaminated soils. However, in one or more embodiments of the invention, a hazardous material treatment composition may optionally be altered and/or tailored for a particular contaminated soil based, at least in part, on analysis of soil and contaminant properties. Initially, a contaminated soil sample may be collected and analyzed. By way of example, the soil may be analyzed for water content, organic content, hazardous material type, hazardous material content, electrical conductivity, compressive strength, pH, salt content, and optionally other parameters. The hazardous material treatment composition may be formed or modified based at least in part on the analysis. By way of example, the type of zeolite or other sorbent may be determined based on the type of hazardous material, the amount of zeolite or other sorbent may be determined based on the amount of hazardous material, the amount of water needed for addition to the hazardous material treatment composition may be determined based on the amount of water in the soil, the amount of cement to add may potentially be based in part on the compressive strength, and/or the amount of salt in the composition may potentially be based on the amount of salt in the soil. Such adaptations may potentially improve treatment, but are not required. Leaching tests may also optionally be formed on treated samples prior to large-scale remediation treatment. However, such tailoring of the treatment composition is optional and not required. Prepackaged general-purpose treatment compositions may also optionally be used.

VIII. EXAMPLES

Having been generally described, the following examples are given as particular embodiments of the invention, to illustrate some of the properties and demonstrate the practical advantages thereof, and to allow one skilled in the art to utilize the invention. It is understood that these examples are to be construed as merely illustrative.

Example 1

Experiments have been performed to demonstrate that treatment as disclosed herein may significantly increase the compressive strength of soil. A sample of soil was treated with a hazardous material treatment composition similar to that shown in Table 4. The volume ratio of soil to treatment composition was on the order of 1:10. About 2.5 wt % Portland cement was used. The compressive strength measurements were made using ASTM C-39. The results indicated that the compressive strength of the treated soil increased over time. After several days, the compressive strength of the treated soil was generally found to be greater than about 80 psi, which is significantly greater than the compressive strength of the original soil before treatment.

Example 2

This example demonstrates the effectiveness of treating various contaminated samples with treatment compositions and methods as disclosed herein. The samples were treated using compositions similar to those disclosed in Table 4 using methods similar to those disclosed herein. Leaching was assessed by method EPA 1311. Results are listed in Table 5.

TABLE 5

| DESCRIPTION OF SAMPLE | Contaminant | LEACHING BEFORE TREATMENT | LEACHING AFTER TREATMENT | HARDNESS (COMPRSSION STRENGTH) AFTER TREATMENT |
|---|---|---|---|---|
| Tar laden clay soil | Antimony | 42.5 ug/g | 0.09 ug/l | 1.8 MPa |
|  | Arsenic | 115 ug/g | 0.03 ug/l |  |
|  | Lead | 625 ug/g | Non Detectable |  |
|  | Mod. TPH | 130000 | Non Detectable |  |

TABLE 5-continued

| DESCRIPTION OF SAMPLE | Contaminant | LEACHING BEFORE TREATMENT | LEACHING AFTER TREATMENT | HARDNESS (COMPRSSION STRENGTH) AFTER TREATMENT |
|---|---|---|---|---|
| Alkaline clay soil | Benzene | 0.072 mg/l | 0.021 mg/l | 1.65 MPa |
| | Toluene | 0.142 | 0.030 | |
| | Xylene | 0.009 | <0.002 | |
| | Ethylbenzene | 0.088 | 0.018 | |

Method: EPA 1311

As shown the leaching after the treatment was in all cases reduced compared to leaching before treatment. Also, significant increase in compressive strength is obtained after treatment. Similar reductions in leaching and increases in compressive strength are reasonably expected for a wide variety of hazardous materials if treated as disclosed herein.

IX. OTHER MATTERS

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description.

It will also be appreciated, by one skilled in the art, that modifications may be made to the embodiments disclosed herein, such as, for example, to the sizes, configurations, functions, materials, and manner of operation of the components of the embodiments. All equivalent relationships to those illustrated in the drawings and described in the specification are encompassed within embodiments of the invention.

Various operations and methods have been described. Some of the methods have been described in a basic form, but operations may optionally be added to and/or removed from the methods. The operations of the methods may also often optionally be performed in different order. Many modifications and adaptations may be made to the methods and are contemplated.

For clarity, in the claims, any element that does not explicitly state "means for" performing a specified function, or "step for" performing a specified function, is not to be interpreted as a "means" or "step" clause as specified in 35 U.S.C. Section 112, Paragraph 6. In particular, any potential use of "step of" in the claims herein is not intended to invoke the provisions of 35 U.S.C. Section 112, Paragraph 6.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

Accordingly, while the invention has been thoroughly described in terms of several embodiments, those skilled in the art will recognize that the invention is not limited to the particular embodiments described, but may be practiced with modification and alteration within the spirit and scope of the appended claims. The description is thus to be regarded as illustrative instead of limiting.

What is claimed is:

1. A method comprising:
   determining a type of sorbent to be used to treat a contaminated soil based on a type of contaminant in the contaminated soil;
   combining the contaminated soil having the contaminant with the determined type of sorbent and salt, the salt being used in a greater amount than the sorbent;
   mixing the contaminated soil, the sorbent, the salt, and water to form a resulting mixture;
   during said mixing, sorbing the contaminant with the sorbent;
   during said mixing, crystallizing the salt around the sorbent;
   mixing an inorganic, binding agent with the resulting mixture; and
   hardening the inorganic binding agent around the crystallized salt and around the sorbent.

2. The method of claim 1, wherein said mixing the contaminated soil, the sorbent, the salt, and the water comprises mixing for less than 10 minutes using a plough mixer operating at a Froude number ranging from 6 to 8.

3. The method of claim 1, further comprising, prior to said hardening the inorganic binding agent, molding the resulting mixture including the inorganic binding agent to form a shaped product.

4. The method of claim 3, wherein the inorganic binding agent comprises cement, and wherein said forming the shaped product comprises forming one of a jersey barrier, a sidewalk portion, a brick, and a cement pipe.

5. The method of claim 1, further comprising determining an amount of the inorganic binding agent based, at least in part, on one or more selected from a predetermined compressive strength of soil specified by a building code and a compressive strength of the contaminated soil.

6. The method of claim 1, wherein the salt comprises halide salt and sulfate salt, and wherein said crystallizing the salt comprises forming intergrown and interlocking halide salt crystals and sulfate salt crystals around the sorbent.

7. The method of claim 1, wherein the salt comprises monovalent cation halide salt and polyvalent cation halide salt, and wherein said crystallizing the salt comprises forming intergrown and interlocking monovalent cation halide salt crystals and polyvalent cation halide salt crystals around the sorbent.

8. The method of claim 1, wherein said determining the type of the sorbent based on the type of the contaminant comprises determining a plurality of different types of sorbents to each sorb a different type of contaminant in the soil.

9. The method of claim 1, further comprising determining an amount of the sorbent based on an amount of the contaminant in the soil.

10. The method of claim 1, wherein said determining the type of the sorbent to be used to treat the contaminated soil based on the type of the contaminant in the contaminated soil comprises determining the type of the sorbent to be a non-zeolite material.

11. The method of claim 10, wherein the non-zeolite material is at least one of an activated carbon and a chelating agent.

12. The meted of claim 1, further comprising pre-treating the sorbent to promote better sorption of the contaminant.

13. The method of claim 1, wherein said combining the contaminated soil with the sorbent comprises combining the contaminated soil with at least one of: (1) a zeolite that has cavities that have been pre-treated to have a stationary solvent phase therein to sorb organics; (2) a zeolite that has cavities that have been pre-treated to add a trap therein to trap at least one of a small molecule and an ions; and (3) a zeolite that has been pre-treated to promote binding of the hazardous material.

14. A method comprising:
treating a contaminated soil with a salt, and sorbent, the salt being used in a greater amount than the sorbent, the sorbent comprising at least one selected from:
an activated carbon;
a chelating agent;
a zeolite that has cavities that have been pre-treated to have a stationary solvent phase therein to sorb organics;
a zeolite that has cavities that have been pre-treated to add a trap therein to trap at least one of a small molecule and an ion; and
treating the resulting material with one or more inorganic binding agents.

15. The method of claim 14, wherein the contaminated soil is mixed with the salt using a fluidized bed.

16. The method of claim 14, wherein the contaminated soil is mixed with the salt using a plough mixer at a Froude number ranging from 6 to 8.

17. The method of claim 14, further comprising:
determining an amount of the one or more inorganic binding agents based, at least in part, on one or more selected from a predetermined compressive strength of soil specified by a building code and a compressive strength of the contaminated soil; and
stabilizing soil with the material treated with the one or more inorganic binding agents by returning the material treated with the one or more inorganic binding agents to the soil.

18. The method of claim 14, further comprising:
shaping a material having the one or more inorganic binding agents; and
hardening the shaped material to form a shaped product.

19. The method of claim 18, wherein the inorganic binding agent comprises cement, and wherein said shaping the material comprises shaping the material in a shape of a jersey barrier, a sidewalk portion, and a cement pipe.

20. The method of claim 14, wherein the salt comprises halide salt and sulfide salt, and wherein said treating the contaminated soil comprises sorbing contaminant with the sorbent, and crystallizing the salt around the sorbent including forming intergrown and interlocking halide salt crystals and sulfate salt crystals around the sorbent.

21. The method of claim 14, wherein the salt comprises monovalent cation halide salt and polyvalent cation halide salt, and wherein said treating the contaminated soil comprises sorbing contaminant with the sorbent, and crystallizing the salt around the sorbent including forming intergrown and interlocking monovalent cation halide salt crystals and polyvalent cation halide salt crystals around the sorbent.

22. The method of claim 14, further comprising determining a type of the sorbent used to treat the contaminated soil based on a type of the contaminant in the contaminated soil.

23. The method of claim 22, wherein said determining the type of the sorbent comprises determining a plurality of different types of sorbents to each be used to treat the contaminated soil and to sorb a different type of contaminant in the soil.

24. The method of claim 14, further comprising determining an amount of the sorbent based on an amount of the contaminant in the soil.

25. The method of claim 14, wherein said treating the resulting material with one or more inorganic binding agents comprises treating the resulting material with lime.

26. A method comprising:
combining a sorbent with a contaminated soil having a contaminant;
mixing the sorbent with the contaminated soil;
sorbing the contaminant with the sorbent while the sorbent and the contaminated soil are being mixed;
mixing a salt with the sorbent and the contaminated soil;
after the sorbent has sorbed the contaminant, crystallizing the salt around the sorbent that has sorbed the contaminant while the salt is mixed with the sorbent and the contaminated soil;
after said mixing the salt with the contaminated soil, adding an inorganic binding agent to the mixture of the sorbent, the salt, and the contaminated soil;
mixing the inorganic binding agent with the mixture of the salt, the sorbent, and the contaminated soil; and
hardening the inorganic binding agent around the salt that is crystallized around the sorbent.

27. The method of claim 26, wherein said combining the sorbent with the contaminated soil comprises combining a sorbent having a type that is based on a type of contaminant in the contaminated soil.

28. The method of claim 27, wherein said combining the sorbent with the contaminated soil comprises combining an amount of the sorbent that is based on an amount of the contaminant in the contaminated soil.

29. The method of claim 26, wherein said combining the sorbent with the contaminated soil comprises combining a plurality of different types of sorbents to each sorb a different type of contaminant in the contaminated soil.

30. The method of claim 26, wherein said combining the sorbent with the contaminated soil comprises combining a sorbent selected from an activated carbon, a chelating agent, a zeolite that has cavities that have been pre-treated to have a stationary solvent phase therein to sorb organics, and a zeolite that has cavities that have been pre-treated to add a trap therein to trap at least one of a small molecule and an ions, with the contaminated soil.

* * * * *